(12) United States Patent
Vishnyakov et al.

(10) Patent No.: US 10,831,917 B2
(45) Date of Patent: Nov. 10, 2020

(54) DATABASE SYSTEM CONSENSUS-BASED ACCESS CONTROL

(71) Applicant: AT&T Intellectual Property I, L.P., Atlanta, GA (US)

(72) Inventors: Andrew Vishnyakov, Frisco, TX (US); Dan Flynn, Plano, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 136 days.

(21) Appl. No.: 16/174,171

(22) Filed: Oct. 29, 2018

(65) Prior Publication Data

US 2020/0134217 A1   Apr. 30, 2020

(51) Int. Cl.
| | | |
|---|---|---|
| G06F 21/00 | (2013.01) | |
| G06F 21/62 | (2013.01) | |
| G06F 16/248 | (2019.01) | |
| G06F 16/2455 | (2019.01) | |

(52) U.S. Cl.
CPC ........ *G06F 21/6218* (2013.01); *G06F 16/248* (2019.01); *G06F 16/2456* (2019.01)

(58) Field of Classification Search
CPC ............. G06F 21/6218; G06F 16/2456; G06F 16/248; G06F 16/93; G06F 16/00; G06F 16/245; G06F 16/27
See application file for complete search history.

(56) References Cited

U.S. PATENT DOCUMENTS

| | | |
|---|---|---|
| 7,207,067 B2 | 4/2007 | Feng et al. |
| 7,322,047 B2 | 1/2008 | Redlich et al. |
| 7,905,417 B2 | 3/2011 | Leiper |
| 8,224,979 B2 | 7/2012 | Herz et al. |

(Continued)

FOREIGN PATENT DOCUMENTS

| | | |
|---|---|---|
| EP | 1193587 B1 | 7/2012 |
| WO | 2000000879 A2 | 2/2000 |

(Continued)

OTHER PUBLICATIONS

De Lange, Willem J., et al. "An operational, multi-scale, multi-model system for consensus-based, integrated water management and policy analysis: The Netherlands Hydrological Instrument." Environmental Modelling & Software 59 (2014): 98-108. https://www.sciencedirect.com/science/article/pii/S1364815214001406.

(Continued)

Primary Examiner — Yogesh Paliwal (57) ABSTRACT

A processing system may obtain an operations set associated with database sources of a database system from a client entity, the operations set including a statement, the statement including a query, identify data sets from the operations set, transmit, a request to a first owner to permit access to a first data set, and a request to a second owner to permit access to a second data set, and receive approvals from the first and second owners. The processing system may retrieve a first portion of data stored in the first data set and a second portion of data stored in the second data set in accordance with the approvals, execute the operations set in accordance with the first portion of data and the second portion of data to generate a result set, and provide the client entity access to the result set.

20 Claims, 4 Drawing Sheets

(56) References Cited

U.S. PATENT DOCUMENTS

| | | | |
|---|---|---|---|
| 8,306,831 | B2 | 11/2012 | Eisenberger et al. |
| 8,364,500 | B2 | 1/2013 | Eisenberger et al. |
| 8,433,917 | B2 | 4/2013 | Yuriyama et al. |
| 8,893,300 | B2 | 11/2014 | Ramachandran et al. |
| 9,325,715 | B1 | 4/2016 | Chereshnev et al. |
| 9,396,337 | B2 | 7/2016 | Hansen |
| 9,619,661 | B1 | 4/2017 | Finkelstein |
| 9,621,644 | B2 | 4/2017 | Bruce |
| 9,747,652 | B2 | 8/2017 | Eisenberger et al. |
| 9,792,648 | B1 | 10/2017 | Haller et al. |
| 9,860,216 | B2 | 1/2018 | Bruce et al. |
| 9,875,376 | B1 | 1/2018 | Duhaime et al. |
| 9,892,278 | B2 | 2/2018 | Avrahami et al. |
| 9,904,957 | B2 | 2/2018 | Garcia et al. |
| 2003/0101341 | A1* | 5/2003 | Kettler, III .......... G06F 21/6245 713/162 |
| 2004/0249839 | A1* | 12/2004 | Beenau .............. G06Q 20/3572 |
| 2011/0247051 | A1* | 10/2011 | Bulumulla .............. G06F 21/00 726/4 |
| 2012/0185921 | A1* | 7/2012 | Wechsler ................ H04L 63/08 726/4 |
| 2014/0180950 | A1 | 6/2014 | Sinclair et al. |
| 2018/0096166 | A1 | 4/2018 | Rogers et al. |

FOREIGN PATENT DOCUMENTS

| | | |
|---|---|---|
| WO | 2002007060 A1 | 1/2002 |
| WO | 2009046389 A1 | 4/2009 |
| WO | 2016063092 A1 | 4/2016 |
| WO | 2017131695 A1 | 8/2017 |
| WO | 2017140213 A1 | 8/2017 |
| WO | 2017187207 A1 | 11/2017 |

OTHER PUBLICATIONS

Ferraiolo, David F., et al. "Proposed NIST standard for role-based access control." ACM Transactions on Information and System Security (TISSEC) 4.3 (2001): 224-274. https://arxiv.org/pdf/0903.2171.pdf.

Litwin, Witold, Leo Mark, and Nick Roussopoulos. "Interoperability of multiple autonomous databases." ACM Computing Surveys (CSUR) 22.3 (1990): 267-293. https://drum.lib.umd.edu/bitstream/handle/1903/4861/TR_89-12.pdf?origin=publication_detail?sequence=1.

Chaudhuri, Surajit, Tanmoy Dutta, and S. Sudarshan. "Fine grained authorization through predicated grants." Data Engineering, 2007. ICDE 2007, IEEE 23rd International Conference, IEEE, 2007. https://www.microsoft.com/en-us/research/wp-content/uploads/2016/02/FGALanguageICDE07.pdf.

Schadt, Eric E., et al. "Computational solutions to large-scale data management and analysis." Nature Reviews Genetics 11.9 (2010): 647. https://www.ncbi.nlm.nih.gov/pmc/articles/PMC3124937/pdf/nihms304947.pdf.

* cited by examiner

DATABASE SYSTEM CONSENSUS-BASED ACCESS CONTROL

The present disclosure relates generally to data set storage and access, and more particularly to methods, computer-readable media, and devices for executing an operations set associated with a database system in accordance with approvals from a plurality of data set owners.

BACKGROUND

Many big data and data science projects involve a combination (join) of data sets from multiple data owners. In one example, a data analyst may gain access to a single data set through an approval chain. For example, the data analyst may declare a need for data X, and the owner of data X may grant access, e.g., after obtaining the data analyst's agreement to a non-disclosure agreement, various terms and conditions, etc. Access credentials may be provided to the data analyst, and then the data analyst may access the data, e.g., for a limited time until the access credentials expired. This may be repeated for different data sets possessed by different data owners. There may be some heuristics around the timespans for having access to the data, the time periods covered by the data, and hierarchical approvals. Nevertheless, once the data analyst has full access, he or she may then freely manipulate the data obtained from all of the sources. More specifically, how the data is used by the data analyst is not controlled, other than to trust that the data analyst will abide by any agreed upon terms and conditions.

SUMMARY

In one example, the present disclosure describes a method, computer readable medium and device for executing an operations set associated with a database system in accordance with approvals from a plurality of data set owners. For instance, in one example, a processing system including at least one processor may receive, from a client entity, an operations set associated with a database system, the operations set comprising at least one statement, the at least one statement including at least one query, and where the operations set is associated with a plurality of data sets of the database system. The processing system may then identify the plurality of data sets from the operations set, transmit, in response to the identifying, a request to a first owner of a first data set of the plurality of data sets, to permit an access to the first data set, and a request to a second owner of a second data set of the plurality of data sets, to permit an access to the second data set, and receive a first approval to access the first data set from the first owner, and a second approval to access the second data set from the second owner. The processing system may further retrieve at least a first portion of data stored in the first data set in accordance with the first approval and at least a second portion of data stored in the second data set in accordance with the second approval, execute the operations set in accordance with the at least the first portion of data and the at least the second portion of data to generate a result set, and provide an access to the result set to the client entity.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, non-transitory (i.e., tangible or physical) computer-readable storage media, and methods for executing an operations set associated with a database system in accordance with approvals from a plurality of data set owners. Many real-life big data and data science projects involve a combination (join) of data sets from multiple data owners. With data becoming an increasingly valuable asset, there is a certain degree of distrust and sensitivity around sharing of such assets of individual enterprises. This creates a contradiction: to benefit from certain types of data assets, the data assets may need to be combined and aggregated across multiple enterprises, yet the parties involved may be unwilling to risk unconstrained dataset sharing with other participants for the particular analytical project. In addition, when data is shared, it may be administratively complex, e.g., involving access control lists (ACLs), data owner control along the entire path of data exposure, auditability and vulnerability to administrator access, and so forth.

In contrast, examples of the present disclosure provide consensus-based access control to sensitive data sets owned by multiple parties for the purpose of creating derived data sets and analytics, fine-grained access control to only those subsets and projections of the original data sets that are requested and/or needed for further processing (as opposed to full, unconstrained access to the entire original data set), and consensus-based publishing, allowing data owners to ensure that the resulting derived data set does not violate customers' privacy and/or a company's policies and procedures. Examples of the present disclosure may include private (protected) data stores/sandboxes that belong to individual data owners and data analysts, a data processing engine that allows multiple data sets to be filtered, combined, and projected (for instance, only a subset of columns from a table may be selected for further processing), a consensus engine, coupled with the data processing engine, that can process requests for data access to obtain approvals or denials from data owners, and an immutable lineage tracker that captures changes associated with data visibility or data access.

In one example, the consensus engine may process an operations set (e.g., comprising a query including a data join, or a union of at least two queries relating to at least two different data sets) from a data analyst, split the operations set into constituent parts and relational algebra operators (e.g., data sets requested, columns/projections, selection criteria, foreign/join keys, etc.) and deliver requests for those parts of the data sets in human readable form to the respective data owners for their approvals. In one example, when collective (consensus) approval is obtained, data access is granted by the consensus engine and the operations set may be executed via the data processing engine. After the operations set is performed, the results are stored in a private data store of the data analyst. In order to export or publish the results to other parties (outside of the original set of data owners), in one example, the data analyst may submit another request for publishing to the data owners. The data owners may inspect the resulting (derived) data set for correctness, privacy compliance, enterprise policies, and so forth, and either approve or deny the publishing request. In one example, at each step along the way from the original data access request to the eventual publishing of a derived data set, lineage is tracked in an immutable store each time the visibility or accessibility of the data is changed. This provides an auditable, indisputable record of data access, processing, and publishing events. These and other aspects of the present disclosure are discussed in greater detail below in connection with the examples of FIGS. 1-4.

Figure 1:
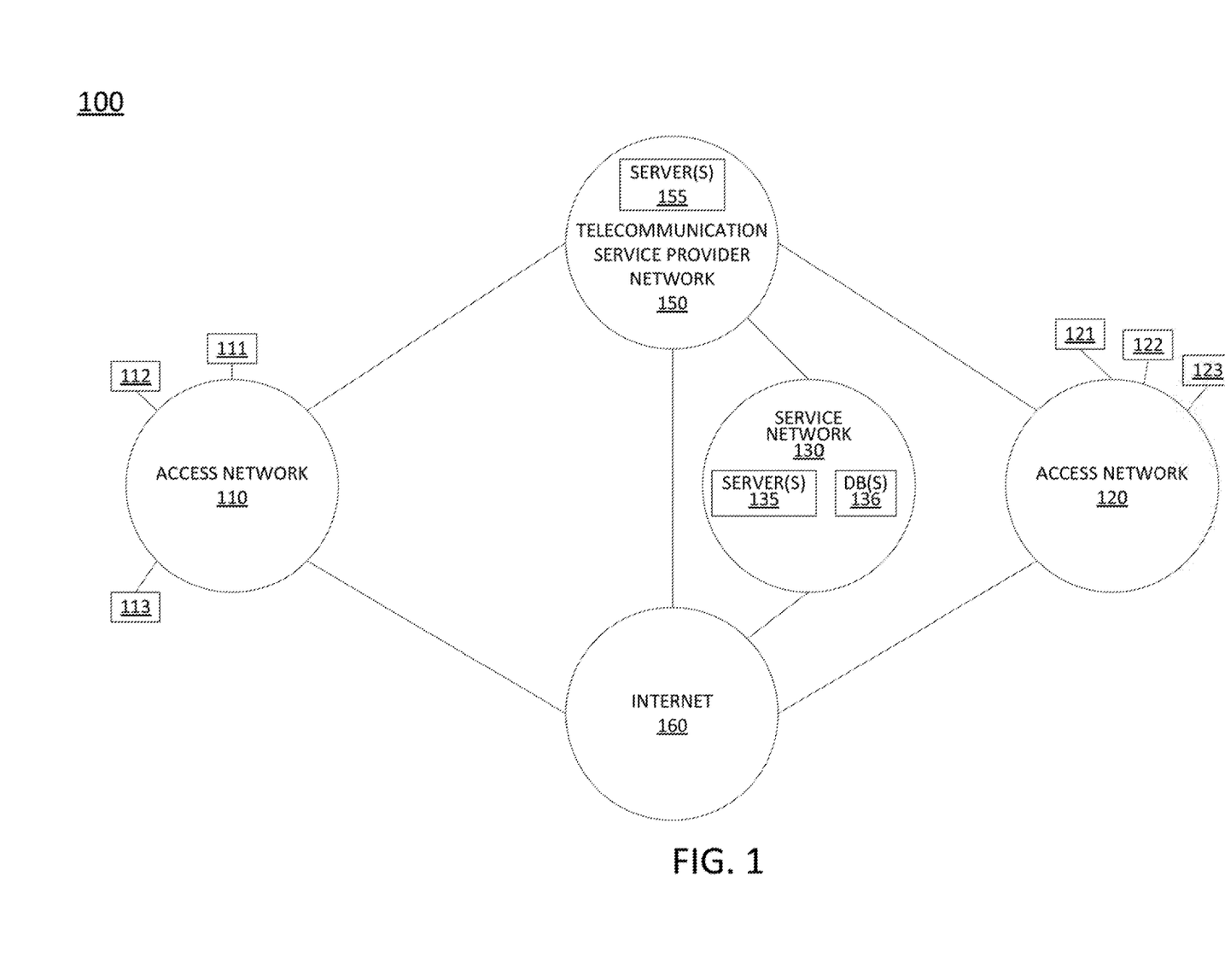
FIG. 1 illustrates one example of a system related to the present disclosure.

To aid in understanding the present disclosure, FIG. 1 illustrates an example system 100 comprising a plurality of different networks in which examples of the present disclosure for executing an operations set associated with a database system in accordance with approvals from a plurality of data set owners may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing system, such as computing system 400 depicted in FIG. 4, and may be configured to host one or more centralized system components in accordance with the present disclosure. For example, a first centralized system component may comprise a database of assigned telephone numbers, a second centralized system component may comprise a database of basic customer account information for all or a portion of the customers/subscribers of the telecommunication service provider network 150, a third centralized system component may comprise a cellular network service home location register (HLR), e.g., with current serving base station information of various subscribers, and so forth. Other centralized system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other centralized system components may include, for example, a layer 3 router, a short message service (SMS) server, a voicemail server, a video-on-demand server, a server for network traffic analysis, and so forth. It should be noted that in one example, a centralized system component may be hosted on a single server, while in another example, a centralized system component may be hosted on multiple servers, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user devices and/or one or more servers of one or more data set owners, such as a weather data service, a traffic management service (such as a state or local transportation authority, a toll collection service, etc.), a payment processing service (e.g., a credit card company, a retailer, etc.), a police, fire, or emergency medical service, and so on.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide service network 130 functions, e.g., of a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed. In another example, service network 130 may represent a third-party network, e.g., a network of an entity that provides a service for executing an operations set associated with a database system in accordance with approvals from a plurality of data set owners, in accordance with the present disclosure.

In the example of FIG. 1, service network 130 may include one or more servers 135 which may each comprise all or a portion of a computing device or system, such as computing system 400, and/or processing system 402 as described in connection with FIG. 4 below, specifically configured to perform various steps, functions, and/or operations for executing an operations set associated with a database system in accordance with approvals from a plurality of data set owners, as described herein. For example, one of server(s) 135, or a plurality of servers 135 collectively, may perform operations in connection with the example method 300, or as otherwise described herein. In one example, the one or more of the servers 135 may comprise a consensus engine, a data processing engine, and a lineage tracker, as described in greater detail below in connection with the example system 200 of FIG. 2.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of systems for executing an operations set associated with a database system in accordance with approvals from a plurality of data set owners, as described herein. As just one example, DB(s) 136 may be configured to receive and store network operational data collected from the telecommunication service provider network 150, such as call logs, mobile device location data, control plane signaling and/or session management messages, data traffic volume records, call detail records (CDRs), error reports, network impairment records, performance logs, alarm data, and other information and statistics, which may then be compiled and processed, e.g., normalized, transformed, tagged, etc., and forwarded to DB(s) 136, via one or more of the servers 135.

Similarly, DB(s) 136 may receive and store weather data from a device of a third-party, e.g., a weather service, a traffic management service, etc. via one of access networks 110 or 120. For instance, one of endpoint devices 111-113 or 121-123 may represent a weather data server (WDS). In one example, the weather data may be received via a weather service data feed, e.g., an NWS extensible markup language (XML) data feed, or the like. In another example, the weather data may be obtained by retrieving the weather data from the WDS. In one example, DB(s) 136 may receive and store weather data from multiple third-parties. Similarly, one of endpoint devices 111-113 or 121-123 may represent a server of a traffic management service and may forward various traffic related data to DB(s) 136, such as toll payment data, records of traffic volume estimates, traffic signal timing information, and so forth. In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like.

As mentioned above, any one or more of endpoint devices 111-113 and/or endpoint devices 121-123 may comprise devices of data set owners for uploading and offering data sets for sharing, purchase, lease, download, licensing, etc. via server(s) 135. Alternatively, or in addition, any one or more of the endpoint devices 111-113 and/or endpoint devices 121-123 may comprise a client device for submitting a proposed operations set to server(s) 135, for receiving access to a result set when the proposed operations set is approved by a plurality of data set owners and executed via server(s) 135, and so forth. In this regard, server(s) 135 may maintain communications with one or more of the endpoint devices 111-113 and/or endpoint devices 121-123 via access networks 110 and 120, telecommunication service provider network 140, Internet 160, and so forth. Various additional functions of server(s) 135 in connection with executing an operations set associated with a database system in accordance with approvals from a plurality of data set owners are described in greater detail below in connection with the examples of FIGS. 2 and 3.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth. Thus, these and other modifications are all contemplated within the scope of the present disclosure.

Figure 2:
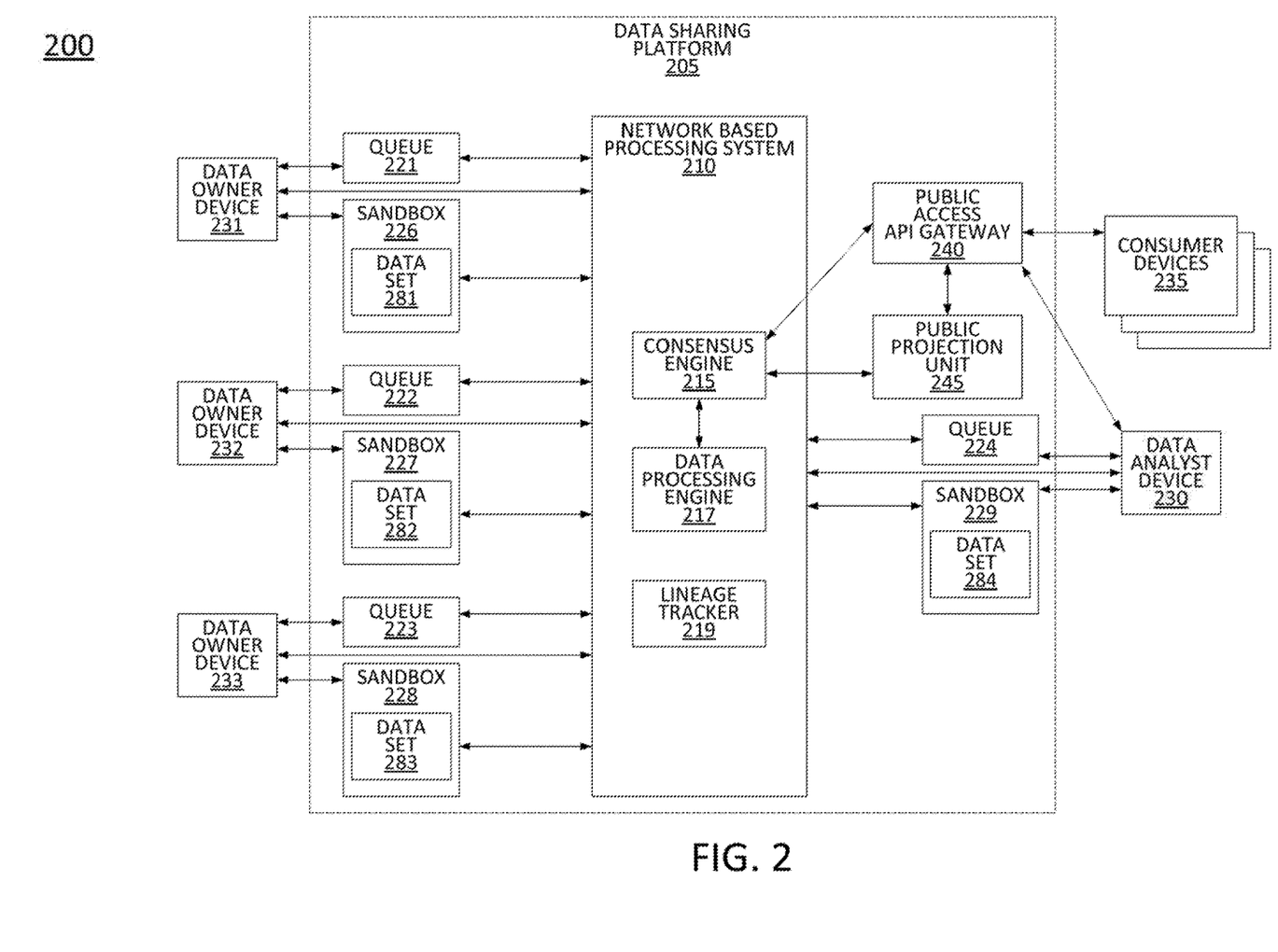
FIG. 2 illustrates an example system including a data sharing platform, according to the present disclosure.

FIG. 2 illustrates an example system 200 including a data sharing platform 205 (e.g., a network-based data sharing platform). In one example, the data sharing platform 205 may comprise a processing system, e.g., a server or multiple servers collectively configured to perform various steps, functions, and/or operations in accordance with the present disclosure. In one example, the data sharing platform 205 includes a network based processing system 210, e.g., a server or multiple servers collectively configured to perform various steps, functions, and/or operations in accordance with the present disclosure. As illustrated in FIG. 2, the network based processing system 210 includes a consensus engine 215, a data processing engine 217, and a lineage tracker 219, the functions of which are described in greater detail below. In one example, the consensus engine 215, the data processing engine 217, and the lineage tracker 219 may each comprise all or a portion of a computing device or system, such as computing system 400, and/or processing system 402 as described in connection with FIG. 4 below, specifically configured to perform various steps, functions, and/or operations in accordance with the present disclosure. The consensus engine 215, the data processing engine 217, and the lineage tracker 219 may comprise separate physical devices, or the functionality of the consensus engine 215, the data processing engine 217, and the lineage tracker 219 may each comprise a virtual machine, an application container, or the like operating on one or more host devices, where the consensus engine 215, the data processing engine 217, and the lineage tracker 219 may fully or partially reside on the same host device(s), on different host devices, and so forth.

It should also-be noted that the components of network based processing system 210 and the data sharing platform 205 may comprise various combinations of computing resources (e.g., processor(s), memory unit(s), and/or storage unit(s)) on the same or different host devices, at the same or different locations (e.g., in the same or different data centers). For example, processors assigned to execute instruction sets for different components may be separate from the associated memory resources, which may be separate from associated storage resources where data sets or other data are stored, and so on.

As further illustrated in FIG. 2, the data sharing platform includes a plurality of queues 221-224 (e.g., "notification queues"), a plurality of sandboxes 226-229 (e.g., "private sandboxes'), a public access application programming interface (API) gateway 240, and a public projection unit 245. In various examples, queues 221-224, sandboxes 226-229, the data sets 281-284 stored in the different sandboxes 226-229, the public access API gateway 240, and/or the public projection unit 245 may comprise virtual machines, application containers, or the like operating on one or more host devices. In addition, each of queues 221-224, sandboxes 226-229, the data sets 281-284 stored in the different sandboxes 226-229, the public access API gateway 240, and/or the public projection unit 245 may comprise various combinations of computing resources, e.g., processor(s), memory unit(s), and/or storage unit(s) on one or more shared host devices and/or on separate host devices. Each of the data sets 281-284 may take a variety of different forms. However, for illustrative purposes, data sets 281-284 may be considered to each include at least one table (e.g., containing at least one row and at least one column). In addition, for illustrative purposes, the data sharing platform 205 may comprise a relational database system (RDBS). However, in other, further, and different examples, data sharing platform 205 may comprise a different type of database system, such as a hierarchical database system, a graph-based database system, etc.

The data sharing platform 205 may provide services to a number of different users, and interact with a number of user devices, such as data owner devices 231-233, data analyst device 230, and consumer devices 235. Each of the user devices may comprise a desktop computer, a cellular smart phone, a laptop, a tablet computer, a cloud based processing system providing a user environment, and so forth. In particular, data sharing platform 205 may be operated by a trusted party to store data sets on behalf of data owners in a secure and restricted manner, to provide data analysts with consensus-based access to multiple data sets in accordance with authorizations from data owners (e.g., for data exploration and/or additional data processing tasks with various data manipulation tools), and to provide public access under the authorizations of data owners. To illustrate, sandbox 226 may store data set 281 for a first data owner, which may comprise network operational data collected from a telecommunication service provider network, such as call logs, mobile device location data, control plane signaling and/or session management messages, data traffic volume records, call detail records (CDRs), error reports, network impairment records, performance logs, alarm data, and other information and statistics. The data set 281 may include raw data and/or may include data that have been normalized, transformed, tagged, etc. before uploading to the data sharing platform 205. In one example, the data in data set 281 may be uploaded via data owner device 231 and stored in sandbox 226. Alternatively, or in addition, the data sharing platform 205 may be configured to obtain and/or receive the data comprising data set 281 directly from a telecommunication network infrastructure (not shown). The sandbox 226 may represent a secure data storage and data processing environment that is only accessible to the first data owner (or another person or entity authorized on behalf of the first data owner) and to the data sharing platform 205.

Similarly, sandbox 227 may store data set 282 for a second data owner, which may comprise weather data of a weather service provider. The data set 282 may include raw data and/or may include data that have been normalized, transformed, tagged, etc. before uploading to the data sharing platform 205. In one example, the data in data set 282 may be uploaded via data owner device 232 and stored in sandbox 227. Alternatively, or in addition, the data sharing platform 205 may be configured to obtain and/or receive the data comprising data set 282 directly from a server of the weather service (not shown). For instance, the weather data may be received via a weather service data feed, e.g., a National Weather Service (NWS) extensible markup language (XML) data feed, or the like. The sandbox 227 may represent a secure data storage and data processing environment that is only accessible to the second data owner (or another person or entity authorized on behalf of the second data owner) and to the data sharing platform 205.

In addition, sandbox 228 may store data set 283 for a third data owner, which may comprise toll payment data, records of traffic volume estimates, traffic signal timing information, and so forth of a traffic management service. The data set 283 may include raw data and/or may include data that have been normalized, transformed, tagged, etc. before uploading to the data sharing platform 205. In one example, the data in data set 283 may be uploaded via data owner device 233 and stored in sandbox 228. Alternatively, or in addition, the data sharing platform 205 may be configured to obtain and/or receive the data comprising data set 283 directly from a server of a traffic management system (not shown). The sandbox 228 may represent a secure data storage and data processing environment that is only accessible to the third data owner (or another person or entity authorized on behalf of the third data owner) and to the data sharing platform 205.

In one example, the various data owners may only make portions of the data sets 281-283 available to other users of the data sharing platform 205 or to the public at large. For instance, the data analyst, via data analyst device 230, may access "public projection" information about data sets 281-283, such as summary information, textual descriptive information, sample data, field headings/identifiers, and so forth via the public access API gateway 240. In one example, the "public projection" information may be stored in the public projection unit 245 and accessed by the data analyst device 230 (and/or other devices, such as a consumer device 235) via public access API gateway 240. The type(s) and quantities of information stored in the public projection unit 245 for each of data sets 281-283 may be authorized, selected, and/or provided by the respective data owners.

In an illustrative example, a data analyst may be interested in testing a hypothesis that may be addressed by combining data in each of data sets 281-283. In accordance with the present disclosure, the data analyst, via data analyst device 230, may identify the availability of the data deemed of interest to the hypothesis by obtaining the "public projection" information for data sets 281-283 in this manner. In one example, once the data analyst identifies the data of interest from the data sets 281-283, e.g., the entirety of a data set, one or more selected fields/columns of a data set, records for an applicable time period, a geographical subset of relevant entries, a subset of relevant entries based upon other values, and so forth, the data analyst may then create an operations set providing one or more operations that the data analyst seeks to run with respect to the data from the respective data sets 281-283.

In accordance with the present disclosure, the operations set may comprise at least one statement, the at least one statement including at least one query, where the operations set is associated with a plurality of data sets. For instance, in one example, the operations set may include a union of at least two queries (e.g., at least two "select" statements) pertaining to at least two of the data sets 281-283. In one example, the operations set may comprise a query (e.g., a "select" statement) that includes a join operation pertaining to at least two of the data sets 281-283. In one example, the operations set may include any number of operations. In one example, the operations set may be in accordance with a Structured Query Language (SQL) syntax, or other types of database query language syntax/format. For instance, the operations set may comprise a SQL script.

Continuing with the present example, the data analyst may submit the operations set to the consensus engine 215 via the data analyst device 230. The consensus engine 215 may be configured to parse the operations set to identify the data sets (e.g., the tables) involved, the fields/columns of each data set involved, and other limiting factors, such as time bounds, geographic bounds, and so on. For instance, the consensus engine 215 may include an SQL parser, or the like. The consensus engine 215 may be further configured to request access permissions from the respective data owners for any of the involved data sets 281-283. In one example, each request may identify the particular data set, the fields/columns of the data set, and any of the limiting factors for the respective data owner's consideration. In one example, the request may also include the set of operations so that the respective data owner may consider the way in which the data analyst intends to combine and otherwise manipulate the data from the respective data set in conjunction with other data sets, particular fields and subsets of records in the other data sets, and so forth. For instance, a data owner may comprise a telecommunications service provider with an obligation to its subscribers to not allow combinations of cell phone location information with employment time sheet records, medical office location records, etc. Thus, by inspection of the proposed operations set, the data owner may determine whether to grant or deny the request.

In one example, the data analyst may further provide a description of any intended use of the data obtained via the operations set. For instance, the data analyst may seek to initially gather the data via the operations set, and may then want to manually explore the data, create charts or other visualizations. The data analyst may alternatively or additionally indicate an intention to apply one or more machine learning (ML) algorithms to the data, to apply statistical processing tools to the data, such as running R scripts, or the like. In one example, a data owner may prefer to deny any requests for which there is not a more detailed description of the intended use, even if the operations set itself may appear to be acceptable. In addition, in one example, a data owner may review the intended use and determine that certain operations of the intended use could additionally be included in the operations set, rather than being applied by the data analyst after obtaining the resultant data set that would be output via the execution of the operations set. In such case, the data owner may reject the request with an indication that additional data processing operations should be included in the operations set, rather than retained for later execution by the data analyst. For instance, a proposed operations set may include an operation that would pull all traffic records from the data set 283 relating to a particular toll booth. A further description of the intended use may indicate that the data analyst wants to look for records relating to a particular time period just prior to a traffic accident of interest. In such case, the data owner associated with data set 283 may indicate that one or more of the operations in the operations set should be modified, and/or one or more additional operations added such that the operations set would pull only the records associated with a particular relevant time period, e.g., a 20 minute time window, rather than attempting to pull all of the records without regard to the relevant time period.

In one example, requests are placed by the consensus engine 215 in respective queues 221-223. In turn the requests may be presented to the data owners via data owner devices 231-233 from the queues 221-223. For instance, data owners may login to and access the data sharing platform 205 at different times. Thus, the different data owners may be presented with respective requests from the queues 221-223, e.g., upon accessing the data sharing platform 205. In addition, the queues 221-223 may include requests relating to different proposed operations sets submitted by the data analyst via data analyst device 230 and/or from other data analysts. The queues 221-223 may be presented as part of a user interface for user devices, e.g., including data owner devices 231-233, to access various components of the data sharing platform 205. Accordingly, in one example, the approvals (or disapprovals) may be provided in any number of ways such as checking a box, clicking a button, etc.

If the request is denied by any one of the involved data owners, the consensus engine 215 may post a notification to the queue 224 for the data analyst. If the data analyst device 230 remains in communication with the data sharing platform 205, the notification may be presented from queue 224 via a user interface for the data analyst device 230. Otherwise, the notification may be presented via queue 224 the next time the data analyst accesses the data sharing platform 205, e.g., via the data analyst device 230 or a different user device. If the requests are accepted and permissions are granted by all of the involved data owners, then a notification of the granting of access may be similarly written to the queue 224 by consensus engine 215 for presentation to the data analyst, e.g., via data analyst device 230. In addition, consensus engine 215 may also pass the operations set to the data processing engine 217 for execution.

The data processing engine 217 may comprise a SQL database engine, or a similar type of database engine. When authorized, the data processing engine 217 may access data sets 281-283 to obtain the relevant data, to filter, join, select columns, generate projections, and/or perform other operations in accordance with the operations set. In one example, the consensus engine 215 may pass one or more tickets (e.g., a Kerberos ticket, an X.509 certificate, or the like), to data processing engine 217 to access the sandboxes 226-228 and/or data sets 281-283 to retrieve the relevant data. In one example, the data processing engine 217 is granted read-only access to the data sets 281-283. When the performance of the operations set is completed, the data processing engine 217 may place the result set into sandbox 229 for the data analyst. In particular, the result set may be stored as data set 284 in sandbox 229. For example, data set 284 may represent at least one table comprising data aggregated from the respective data sets 281-283, where the data is optionally further manipulated via one or more operations in the operations set. In one example, the sandbox 229 (and data set 284 contained therein) is accessible only by the data analyst. For instance, a data owner associated with one of the source data sets 281-283 may be willing to share its data with a data analyst of an educational institution or non-profit entity, but may be unwilling to have other data owners access its data which may reside relatively unchanged from its source form in the data set 284. In another example, the result set is also made available to the owners of data sets 281-283. For instance, copies of the data set 284 may be obtained by the owners of data sets 281-283 upon request and placed in the respective sandboxes 226-228.

In any event, the data analyst may then access the data set 284 via the sandbox 229. In addition, the sandbox 229 may provide a secure environment for the application of additional data visualization and/or data processing tools, such as graph or chart generation tools, animation visualization tools, machine learning algorithms, statistical tools, such as RCloud, TensorFlow, or the like. To illustrate, the data analyst may apply various tools to the data set 284 to attempt to identify whether certain geographic locations, road types, and/or weather conditions are associated with an increase or a decrease in accidents, injuries, fatalities, etc.

In one example, the network based processing system 210 also includes a lineage tracker 219 which may track all of the accesses to the data sets stored in the data sharing platform 205, the changes to the data sets, and the creation of new data sets. For instance, for data set 284, the lineage tracker 219 may first track the origins of portions of the data set 284 from data sets 281-283. In one example, the lineage tracker 219 may identify data owners associated with the data sets 281-283 as also having an ownership interest in data set 284, since data set 284 is derived from the data sets 281-283. The lineage tracker 219 may also track that the data set 284 was generated from the data sets 281-283 via the execution of the operations set via the data processing engine 217. In one example, the lineage tracker 219 may record the derivations of the data set 284, e.g., the extraction of data from data set 281, the extraction of data from data set 282, the extraction of data from data set 283, the application of the operations set, and so forth in a blockchain ledger (e.g., at one or more blockchain nodes, which may comprise components of data sharing platform 205 and/or one or more devices which may be external to the data sharing platform 205).

In one example, the lineage tracker 219 records the data analyst submitting the operations set as having an ownership interest in the data set 284. In one example, the ownership interest of the data analyst may be indicated as a primary ownership interest of data set 284, with the data owners associated with data sets 281-283 being indicated as having secondary ownership interests. It should be noted that after various processing tools are applied to the data set 284, the data set 284 may be in an entirely different form, e.g., due to the performance of the operations set by the data processing engine 217. Nevertheless, all of the data in its various forms derived from data set 284 may be included in what is referred to as data set 284. In other words, data set 284 may be expanded to include all forms of data derived from the result set provided via the data processing engine 217.

In one example, the data analyst may also be interested in releasing information from the data investigation to other users of the data sharing platform 205 and/or to the public at large. For instance, the data analyst may determine an interesting result which may provide a new insight, or may confirm a hypothesis that has not previously been tested, may further confirm a hypothesis that has been proven via other modes of testing or using other data sources, and so forth. The data set 284 may also include data that may be particularly useful in training and/or testing machine learning models and/or machine learning algorithms for various tasks. Thus, the data analyst may wish to release information from the data set 284 in various forms, such as the actual table data from data set 284, or a portion thereof, a chart, a graph, an animation, or the like derived from the data set 284, a textual description of insights from the data set 284, a machine learning algorithm trained via the data set 284, and so forth.

In one example, the data analyst may submit a public release request to consensus engine 215, e.g., via data analyst device 230. In one example, the request may identify whether the release is only to users of the data sharing platform 205, a subset of users of data sharing platform 205, and/or to the public at large. In one example, the request may identify aspects of the data set 284 that may be released, such as certain fields/columns, an entire table, a geographic restriction, a temporal restriction, etc. In one example, the data analyst may provide a sample of the intended information to be released to further aid the data owners associated with the original source data of data sets 281-283 in deciding whether to agree to the public release of the information from data set 284. For instance, the data analyst may include a chart intended to be released, a paper describing the results of the investigation, a portion of a table to be published, etc.

In one example, the requests and approvals (or rejections) may be managed by the consensus engine 215 through queues 221-223. It should be noted that data owner devices 231-233 are illustrated in FIG. 2. However, a data owner may utilize any number of different user devices to interact with data sharing platform 205. Thus, the data owner device used to convey approval or denial of a request to access one of data sets 281-283 may be different from a data owner device that approves or rejects a publication request. If the request is denied by any one of the involved data owners, the consensus engine 215 may post a notification to the queue 224 for the data analyst. In one example, a data owner may also provide suggested modifications and/or provide a reason for a rejection. Thus, the data analyst may attempt to reformulate the information from the data set 284 for publication and resubmit a new request. On the other hand, if the requests are accepted and permissions are granted by all of the involved data owners, then a notification of the granting of permission to publish may be similarly written to the queue 224 by consensus engine 215 for presentation to the data analyst.

When approved, the consensus engine 215 may take various actions depending upon the nature of the request and the type(s) of information to be released/published. For example, if the request is to publish a chart that was generated in the private sandbox 229 as derived from data set 284, the consensus engine may include in the notification in queue 224 or provide a second notification including an authorization ticket to extract the chart from sandbox 229, e.g., to download the chart to the data analyst device 230. The data analyst may then be free to disseminate the chart via any number of modalities, such as placing the chart on a web server, publishing the chart in a journal, etc. If the request is to publish an entire table, the consensus engine 215 may provide the table to the public projection unit 245. If the request is to make the table conditionally available to users of the data sharing platform 205 upon request, the consensus engine 215 may provide a summary about the information in data set 284 to the public projection unit 245 for discovery by the other users via public access API gateway 240. Notably, the information in data set 284 may then be requested by other users, e.g., by other data analysts submitting additional proposed operations sets to the consensus engine 215 for obtaining approvals from data set owners. In such case, consensus engine 215 may submit a request to the data analyst as a primary owner, as well as to the data owners associated with data sets 281-283, as secondary owners of the information in data set 284.

It should also be noted that the example of FIG. 2 is provided as an illustrative example. In other words, in other, further, and different examples, the data sharing platform 205 may comprise a different architecture. For instance, operations that are described as being performing in connection with one component may alternatively or additionally be performed by a different component. In addition, while the data sets 281-284 are illustrated as residing within sandboxes 226-229, it should be noted that the actual storage of these data sets 281-284 may be distributed in a plurality of different storage devices which may reside within a plurality of different physical locations, where the sandboxes 226-228 comprise environments where the respective data sets 281-283 can be fully or partially accessed. For example, sandboxes 226-229 may each represent at least a portion of a respective user application provided to data owner devices 231-233 and to data analyst device 230 via the data sharing platform 205. For instance, the user applications may run on network-based processors and memory units of the data sharing platform 205, where the sandboxes 226-228 may possess security tokens (e.g., decryption keys) for rendering data sets 281-283, respectively. Thus, the storage locations of the data sets 281-283 may be arbitrary, and the data owner devices 231-233 and data analyst device 230 may interact with the data sets 281-284, perform data analysis, visualizations, and so forth via the respective user applications hosted by the hardware components of the data sharing platform 205. In one example, data sets 281-284 may be part of a set of file stores such as a Hadoop Distributed File System (HDFS) and/or another cloud file storage system.

In one example, when interacting with one of the data sets 281-284 via one of the sandboxes 226-229, the data owner devices 231-233 and/or data analyst device 230 may simply receive image/audio data via a network connection. Thus, a user can inspect tables, run statistical analysis scripts, generate animations, charts, and so forth, where all actual data processing operations are executed within the data sharing platform 205, while the user device is simply provided with image and/or audio information via the user application over a network connection. For example, the processor of the data analyst device 230 does not actually operate upon the data set 284, but only receives user application data for presentation via a display, a speaker, or the like, over a network connection to the data sharing platform 205. Thus, these and other variations, modifications, and/or enhancements, are all contemplated within the scope of the present disclosure.

Figure 3:
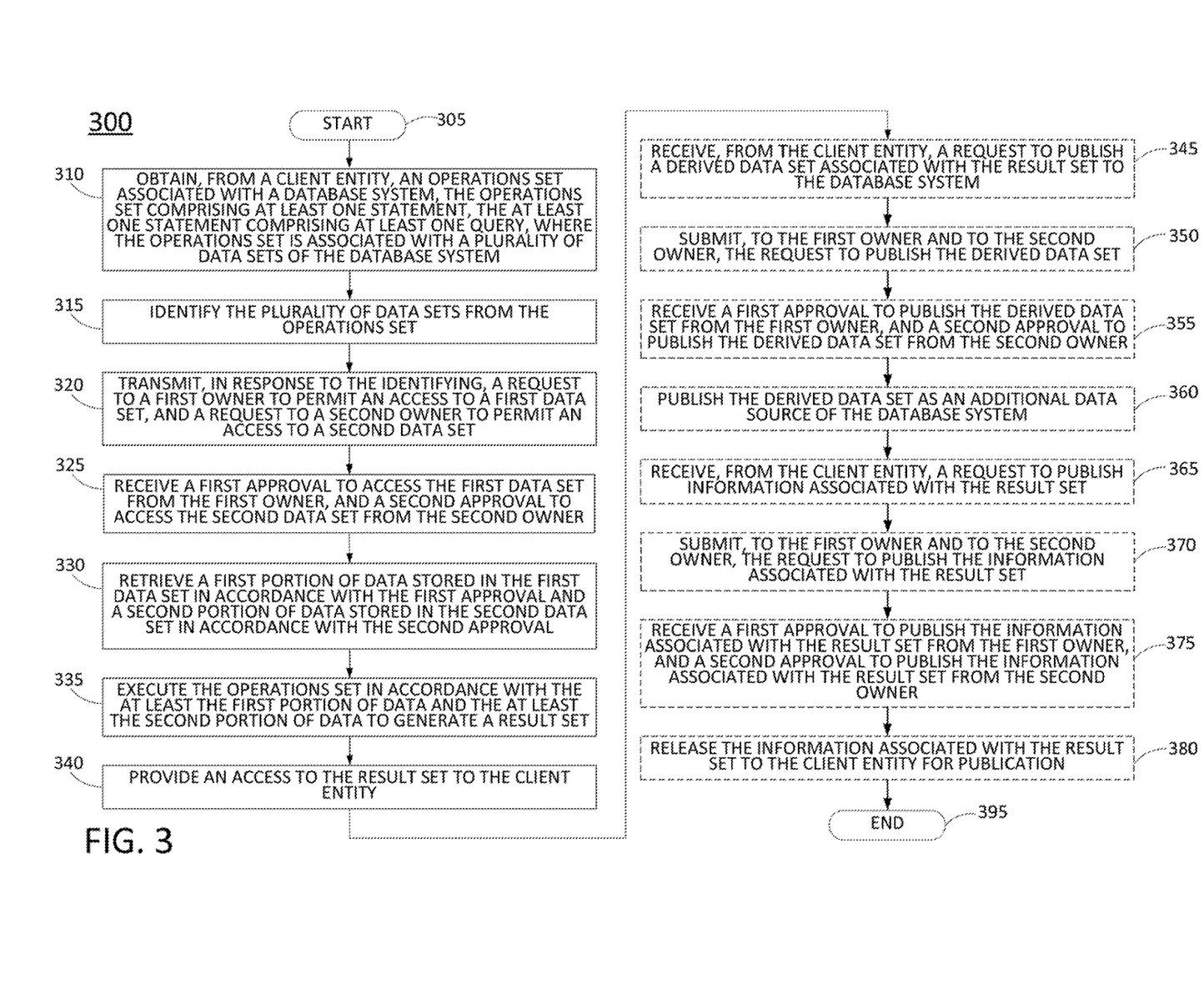
FIG. 3 illustrates an example flowchart of a method for executing an operations set associated with a database system in accordance with approvals from a plurality of data set owners.

FIG. 3 illustrates an example flowchart of a method 300 for executing an operations set associated with a database system in accordance with approvals from a plurality of data set owners. In one example, steps, functions, and/or operations of the method 300 may be performed by a device as illustrated in FIG. 1, e.g., one or more of servers 135, or by data sharing platform 205 (e.g., a network-based processing system) as illustrated in FIG. 2. Alternatively, or in addition, the steps, functions and/or operations of the method 300 may be performed by a processing system collectively comprising a plurality of devices as illustrated in FIG. 1 such as one or more of servers 135, DB(s) 136, endpoint devices 111-113 and/or 121-123, or as illustrated in FIG. 2, such as network based processing system 210, data sharing platform 205, data owner devices 231-233, and so forth. In one example, the steps, functions, or operations of method 300 may be performed by a computing device or system 400, and/or a processing system 402 as described in connection with FIG. 4 below. For instance, the computing device 400 may represent at least a portion of a platform, a server, a system, and so forth, in accordance with the present disclosure. For illustrative purposes, the method 300 is described in greater detail below in connection with an example performed by a processing system. The method 300 begins in step 305 and proceeds to step 310.

At step 310, the processing system receives from a client entity (e.g., a data analyst, or a device of a data analyst) an operations set associated with a database system. The operations set may include at least one statement, where the at least one statement comprises at least one query. In addition, the operations set may be associated with a plurality of data sets of the database system. In one example, the database system may comprise a relational database system (RDBS). In another example, the database system may have a different form, such as a hierarchical database system, a graph-based database systems, etc. In one example, the at least one query may comprise at least one "select" statement (e.g., using SQL). In one example, the at least one query includes a join operation, which may relate to data in respective ones of the plurality of data sets. In one example, the at least one query comprises at least two queries, which may relate to data in respective ones of the plurality of data sets, and the operations set may include a union of the at least two queries (e.g., at least two "select" statements).

At step 315, the processing system identifies the plurality of data sets from the operations set. For instance, the processing system may include an SQL parser, or the like, and may be configured to parse the operations set to identify the one or more data sets involved, the fields/columns of each data set involved, and other limiting factors, such as time bounds, geographic bounds, and so on.

At step 320, the processing system transmits, in response to the identifying, a request to a first owner of a first data set of the plurality of data sets, to permit an access to the first data set, and a request to a second owner of a second data set of the plurality of data sets, to permit an access to the second data set. For instance, in accordance with the present disclosure, each of the data sets is only accessible to an owner of the respective data set (and in one example, to the processing system) without a granting of approval. Each request may identify the particular data set, the fields/columns of the data set, and any of the limiting factors for the respective data owner's consideration. In one example, each request may also include the set of operations so that the respective data owner may consider the way in which the data from the data set is intended to be combined and/or otherwise utilized in conjunction with other data sets, particular fields and/or subsets of records in the other data sets, and so forth. In one example, each request may further include a description of any intended use of the data obtained via the operations set as provided by the client entity. In one example, step 320 may comprise writing the requests to respective notification queues of the processing system that are maintained for the different data owners.

At step 325, the processing system receives a first approval to access the first data set from the first owner, and a second approval to access the second data set from the second owner. It should be noted that an approval can be from a device of an "owner" or can be from a device of a proxy or a representative of the owner, such as from a licensee (imputedly on behalf of an owner).

At step 330, the processing system retrieves at least a first portion of the data stored in the first data set in accordance with the first approval and at least a second portion of the data stored in the second data set in accordance with the second approval. In one example, the first data set comprises at least a first table, and the second data set comprises at least a second table. In one example, the retrieving may be in accordance with one or more tickets (e.g., a Kerberos ticket, an X.509 certificate, or the like), to allow access to the data sets of the respective owners (e.g., maintained as part of the processing system) to retrieve the relevant data.

At step 335, the processing system executes the operations set in accordance with the at least the first portion of data and the at least the second portion of data to generate a result set. For instance, the processing system may include a SQL database engine, or a similar type of database engine, that may access the data sets (or "data sets") to obtain the relevant data at step 330, and that may filter, join, select columns, generate projections, and/or perform other operations in accordance with the operations set at step 335.

At step 340, the processing system provides an access to the result set to the client entity. In one example, the result set comprises at least one table. In one example, the result set is stored by the processing system, and the providing the access to the result set comprises providing a remote access to at least one visualization of the result set to the client entity (e.g., a graphical user interface (GUI) presentation on a user device of the client entity via a user application hosted by the processing system). In one example, the providing the access to the result set further comprises performing, by the processing system, at least one data processing task associated with the result set in response to an instruction from the client entity. In particular, any manipulation of the result set may be performed via hardware of the processing system, where the user device(s) of the client entity may only receive user interface outputs.

For instance, the result set may be stored in a private sandbox of the client entity (e.g., maintained as part of the processing system) through which the client entity may interact with the result set. However, when interacting with the result set, a user device of the client entity may simply receive image/audio data via a network connection. Thus, the client entity can inspect tables, run statistical analysis scripts, generate animations, charts, and so forth, where all actual data processing operations are executed by the processing system, while the user device is simply provided with image and/or audio information via the user application over a network connection.

At optional step 345, the processing system receives from the client entity a request to publish a derived data set associated with the result set to the database system. The derived data set may comprise the result set or a data set resulting from at least one operation performed on the result set. In one example, the at least one operation is performed on the result set via the processing system in response to an instruction received from the client entity. For example, the client entity can run R or Python commands or scripts against the result set, can run ML algorithms on the result set, and so forth to generate the derived data set. The derived data set can be as detailed as the original result set, can be aggregated (e.g., one minute averages instead of raw data which may be every one second, for instance), or may comprise data without a linear mapping to the result set, such as an output of a ML algorithm applied to the result set.

At optional step 350, the processing system may submit, to the first owner and to the second owner, the request to publish the derived data set. In one example, optional step 350 may comprise writing the request to respective notification queues of the processing system that are maintained for the different data owners. In one example, the processing system also records a lineage of the result set. In one example, the lineage includes the plurality of data sets, the operations set that is executed, the client entity, one or more entities accessing the derived data set, and so forth. In addition, in such an example, the request to publish the derived data set may be submitted to the first owner and to the second owner in accordance with the lineage of the result set and/or the derived data set that is recorded.

At optional step 355, the processing system may receive a first approval to publish the derived data set from the first owner, and a second approval to publish the derived data set from the second owner. It should be noted that an approval can be from a device of an "owner" or can be from a device of a proxy or a representative of an owner.

At optional step 360, the processing system may publish the derived data set as an additional data set of the database system. In one example, the client entity is recorded as an owner of the additional data set. In addition, in one example, the first owner and the second owner are recorded as co-owners of the additional data set. For instance, the processing system may track a lineage of the result set and/or the derived data set throughout the performance of the steps of the method 300.

In one example, the processing system provides a summary about the information in the derived data set for discovery by other users, e.g., in a public projection. Notably, the information in the derived data set may then be requested by other users, e.g., by other data analysts submitting additional proposed operations sets to the processing system for obtaining approvals from data set owners. In such case, the processing system may submit a request to the client entity as a primary owner, as well as to the data owners associated with the original source data sets, as secondary owners of the derived data set.

At optional step 365, the processing system may receive, from the client entity, a request to publish information associated with the result set. For example, there may be two types of requests, a first request related to the publication to the database system (which may be received in accordance with optional step 345), and a second request related to the releasing of information regarding the result set outside the database system (at the present optional step 365). The information associated with the result set may be information in a data table format, or in a different format, such as a graph, a text summary, an animation, etc. In addition, the information associated with the result set may comprise raw data of the result set, summary data of the result set, data derived from a processing of the result set via an instruction from the client entity, and so forth. For example, the client entity can run R or Python commands or scripts against the result set, can run ML algorithms on the result set, and so forth to generate the derived data set. The derived data set can be as detailed as original result set, can be aggregated (e.g., one minute averages instead of raw data which may be every one second, for instance), or may comprise data without a linear mapping to the result set, such as an output of a ML algorithm applied to the result set. In one example, the request to publish the information associated with the result set may identify at least one form of publication of the information associated with the result set, such as: a raw data format, a graphical visualization format, a textual descriptive format, an audio descriptive format, or an animated visualization format.

At optional step 370, the processing system may submit, to the first owner and to the second owner, the request to publish the information associated with the result set. In one example, optional step 370 may comprise writing the request to respective notification queues of the processing system that are maintained for the different data owners.

At optional step 375, the processing system may receive a first approval to publish the information associated with the result set from the first owner, and a second approval to publish the information associated with the result set from the second owner. It should be noted that an approval can be from a device of an "owner" or can be from a device of a proxy or a representative of the owner.

At optional step 380, the processing system may release the information associated with the result set to the client entity for publication.

Following step 340, or any of the optional steps 345-380, the method 300 ends in step 395. It should be noted that the method 300 may be expanded to include additional steps or may be modified to include additional operations with respect to the steps outlined above. It should also be noted that in one example, the processing system may include the database system, where the database system may physically reside on one or more host devices. In one example, the processing system may comprise a consensus engine to perform the operations of steps 310-325 (and optional steps 345-380), and a data processing engine to perform the operations of steps 330-340. In such an example, the consensus engine may grant a plurality of access tickets/tokens to the data processing engine to retrieve the at least the first portion of the data and the at least the second portion of the data in accordance with the approvals at step 330. In still another example, optional steps 365-380 may alternatively be performed before optional steps 345-360. Thus, these and other modifications are all contemplated within the scope of the present disclosure.

In addition, although not specifically specified, one or more steps, functions or operations of the method 300 may include a storing, displaying and/or outputting step as required for a particular application. In other words, any data, records, fields, and/or intermediate results discussed in the method 300 can be stored, displayed and/or outputted either on the device executing the method 300, or to another device, as required for a particular application. Furthermore, steps, blocks, functions, or operations in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the examples of the present disclosure.

Figure 4:
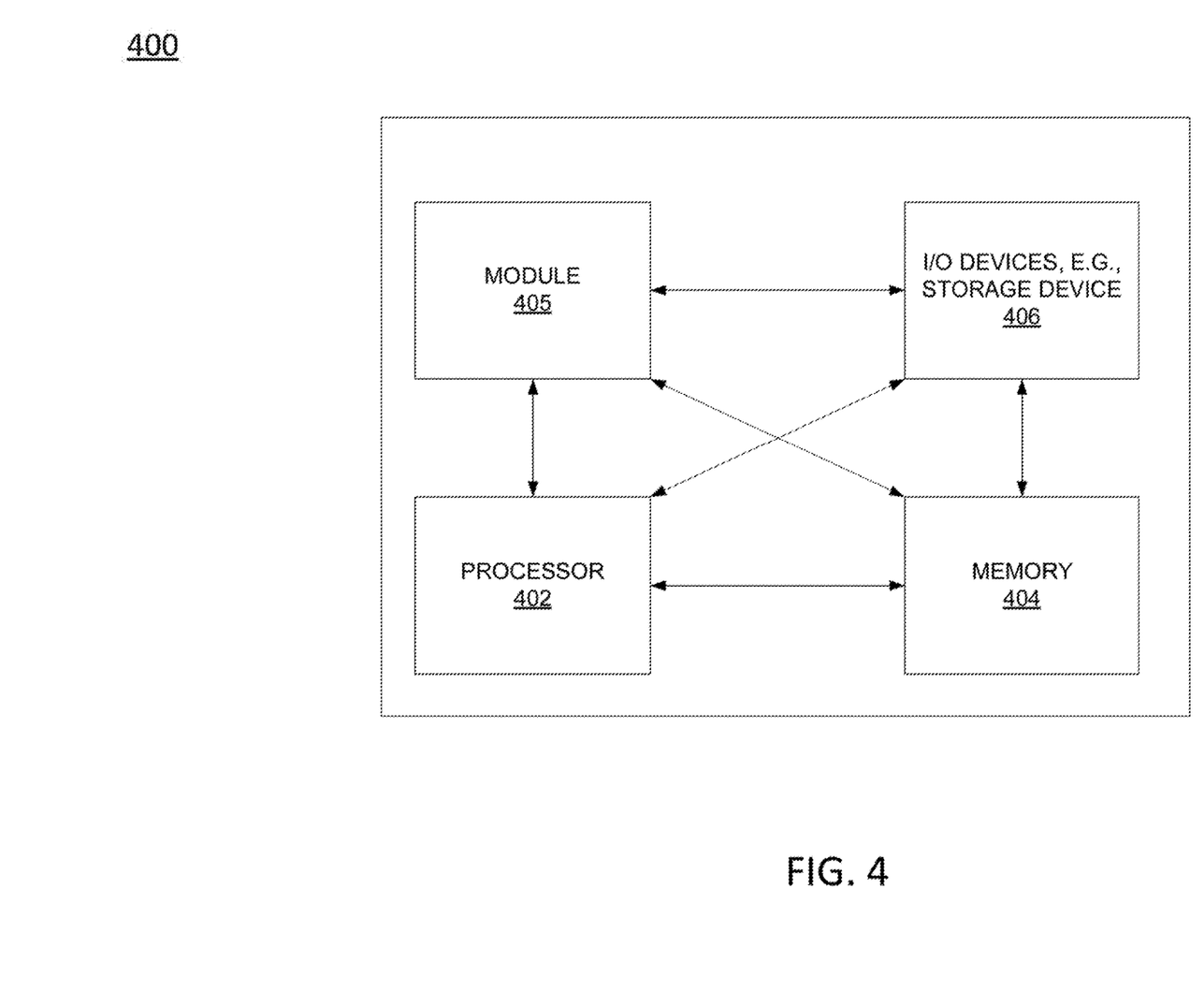
FIG. 4 illustrates a high-level block diagram of a computing device specially programmed to perform the functions described herein.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for executing an operations set associated with a database system in accordance with approvals from a plurality of data set owners, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 are implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for executing an operations set associated with a database system in accordance with approvals from a plurality of data set owners (e.g., a software program comprising computer-executable instructions) can be loaded into memory 404 and executed by hardware processor element 402 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for executing an operations set associated with a database system in accordance with approvals from a plurality of data set owners (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
obtaining, by a processing system including at least one processor from a client entity, an operations set associated with a database system, the operations set comprising at least one statement, wherein the at least one statement comprises at least one query, wherein the operations set is associated with a plurality of data sets of the database system;
identifying, by the processing system, the plurality of data sets from the operations set;
transmitting, by the processing system in response to the identifying, a request to a first owner of a first data set of the plurality of data sets to permit an access to the first data set, and a request to a second owner of a second data set of the plurality of data sets to permit an access to the second data set;
receiving, by the processing system, a first approval to access the first data set from the first owner, and a second approval to access the second data set from the second owner;
retrieving, by the processing system, at least a first portion of data stored in the first data set in accordance with the first approval and at least a second portion of data stored in the second data set in accordance with the second approval;
executing, by the processing system, the operations set in accordance with the at least the first portion of data and the at least the second portion of data to generate a result set; and
providing, by the processing system, an access to the result set to the client entity.

2. The method of claim 1, wherein the result set comprises at least one table.

3. The method of claim 1, wherein the first data set comprises at least a first table, and wherein the second data set comprises at least a second table.

4. The method of claim 1, wherein the result set is stored by the processing system and the providing the access to the result set comprises providing a remote access to at least one visualization of the result set to the client entity.

5. The method of claim 4, wherein the providing the access to the result set further comprises performing, by the processing system, at least one data processing task associated with the result set in response to an instruction from the client entity.

6. The method of claim 1, wherein the at least one query comprises at least two queries, wherein the operations set includes a union of the at least two queries.

7. The method of claim 1, wherein the at least one query includes a join operation.

8. The method of claim 1, wherein the database system comprises a relational database system.

9. The method of claim 1, further comprising:
receiving, from the client entity, a request to publish a derived data set associated with the result set to the database system;
submitting, to the first owner and to the second owner, the request to publish the derived data set;
receiving a first approval to publish the derived data set from the first owner, and a second approval to publish the derived data set from the second owner; and
publishing the derived data set as an additional data set of the database system.

10. The method of claim 9, wherein the client entity is recorded as an owner of the additional data set.

11. The method of claim 10, wherein the first owner and the second owner are recorded as co-owners of the additional data set.

12. The method of claim 9, wherein the derived data set comprises:

the result set; or a data set resulting from at least one operation performed on the result set.

13. The method of claim 12, wherein the at least one operation is performed on the result set via the processing system in response to an instruction from the client entity.

14. The method of claim 9, wherein the processing system records a lineage of the result set, wherein the request to publish the derived data set is submitted to the first owner and to the second owner in accordance with the lineage of the result set that is recorded.

15. The method of claim 1, further comprising:
receiving, from the client entity, a request to publish information associated with the result set;
submitting, to the first owner and to the second owner, the request to publish the information associated with the result set;
receiving a first approval to publish the information associated with the result set from the first owner, and a second approval to publish the information associated with the result set from the second owner; and
releasing the information associated with the result set to the client entity for publication.

16. The method of claim 15, wherein the request to publish the information associated with the result set includes at least one form of publication of the information associated with the result set.

17. The method of claim 16, wherein the at least one form of publication of the information associated with the result set comprises at least one of:
a raw data format;
a graphical visualization format;
a textual descriptive format;
an audio descriptive format; or
an animated visualization format.

18. The method of claim 15, wherein the information associated with the result set comprises:
raw data of the result set;
summary data of the result set; or
data derived from a processing of the result set via an instruction from the client entity.

19. A non-transitory computer-readable storage medium storing instructions which, when executed by a processing system including at least one processor, cause the processing system to perform operations, the operations comprising:
obtaining, from a client entity, an operations set associated with a database system, the operations set comprising at least one statement, wherein the at least one statement comprises at least one query, wherein the operations set is associated with a plurality of data sets of the database system;
identifying the plurality of data sets from the operations set;
transmitting, in response to the identifying, a request to a first owner of a first data set of the plurality of data sets to permit an access to the first data set, and a request to a second owner of a second data set of the plurality of data sets to permit an access to the second data set;
receiving a first approval to access the first data set from the first owner, and a second approval to access the second data set from the second owner;
retrieving at least a first portion of data stored in the first data set in accordance with the first approval and at least a second portion of data stored in the second data set in accordance with the second approval;
executing the operations set in accordance with the at least the first portion of data and the at least the second portion of data to generate a result set; and
providing an access to the result set to the client entity.

20. A device comprising:
a processing system including at least one processor; and
a non-transitory computer-readable medium storing instructions which, when executed by the processing system, cause the processing system to perform operations, the operations comprising:
obtaining, from a client entity, an operations set associated with a database system, the operations set comprising at least one statement, wherein the at least one statement comprises at least one query, wherein the operations set is associated with a plurality of data sets of the database system;
identifying the plurality of data sets from the operations set;
transmitting, in response to the identifying, a request to a first owner of a first data set of the plurality of data sets to permit an access to the first data set, and a request to a second owner of a second data set of the plurality of data sets to permit an access to the second data set;
receiving a first approval to access the first data set from the first owner, and a second approval to access the second data set from the second owner;
retrieving at least a first portion of data stored in the first data set in accordance with the first approval and at least a second portion of data stored in the second data set in accordance with the second approval;
executing the operations set in accordance with the at least the first portion of data and the at least the second portion of data to generate a result set; and
providing an access to the result set to the client entity.

* * * * *